(12) United States Patent
Blenkinsop et al.

(10) Patent No.: US 9,193,539 B2
(45) Date of Patent: Nov. 24, 2015

(54) STORAGE APPARATUS

(71) Applicant: TTP LabTech Ltd., Royston, Hertfordshire (GB)

(72) Inventors: Philip Blenkinsop, Reed Herts (GB); Wayne Bennett, Bedford (GB)

(73) Assignee: TTP Labtech Ltd., Melbourn, Royston, Hertfordshire (GB)

( * ) Notice: Subject to any disclaimer, the term of this patent is extended or adjusted under 35 U.S.C. 154(b) by 220 days.

(21) Appl. No.: 13/889,693

(22) Filed: May 8, 2013

(65) Prior Publication Data
US 2013/0302097 A1 Nov. 14, 2013

(51) Int. Cl.
B65G 51/26 (2006.01)
B65G 47/91 (2006.01)
B01L 1/00 (2006.01)
B01L 7/00 (2006.01)

(52) U.S. Cl.
CPC .............. B65G 47/915 (2013.01); B01L 1/00 (2013.01); B01L 7/50 (2013.01); B01L 2300/1883 (2013.01); B01L 2300/1894 (2013.01)

(58) Field of Classification Search
USPC ................. 406/115, 63, 112, 122, 145, 152; 414/797, 305; 221/120, 122, 265
See application file for complete search history.

(56) References Cited

U.S. PATENT DOCUMENTS

| | | | | |
|---|---|---|---|---|
| 3,575,301 | A * | 4/1971 | Panissidi | 414/618 |
| 4,350,466 | A * | 9/1982 | Bahr et al. | 414/797.8 |
| 4,886,412 | A * | 12/1989 | Wooding et al. | 414/416.05 |
| 5,234,314 | A * | 8/1993 | Ganz | 414/797.8 |
| 5,549,444 | A * | 8/1996 | Dubuit | 414/796.7 |
| 5,846,030 | A * | 12/1998 | Beard et al. | 406/1 |
| 5,931,635 | A * | 8/1999 | Barthold | 414/797.3 |
| 6,257,804 | B1 * | 7/2001 | Gathmann | 406/68 |
| 7,240,805 | B2 * | 7/2007 | Chirnomas | 221/211 |
| 8,061,960 | B2 * | 11/2011 | Hopwood et al. | 414/795.8 |

* cited by examiner

*Primary Examiner* — Joseph Dillon, Jr.
(74) *Attorney, Agent, or Firm* — Barnes & Thornburg LLP

(57) ABSTRACT

A storage apparatus has an annular array of stacked item storage formations, and an epicyclic selector arrangement for extracting items from the array, with a temporary storage unit.

16 Claims, 16 Drawing Sheets

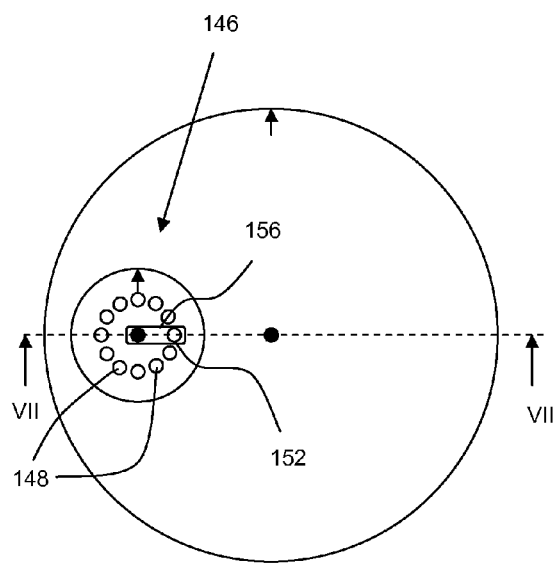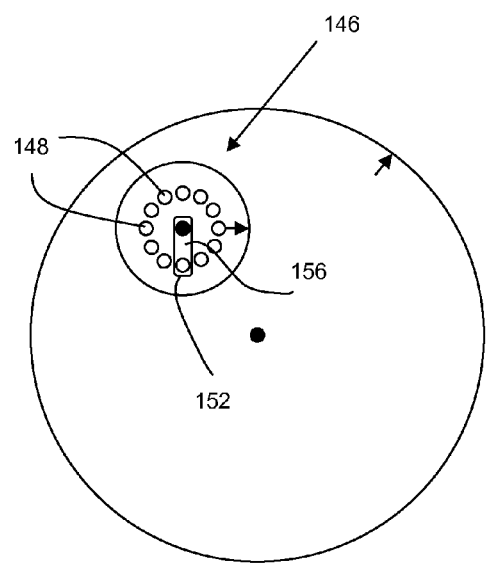
Fig. 6a  Fig. 6b
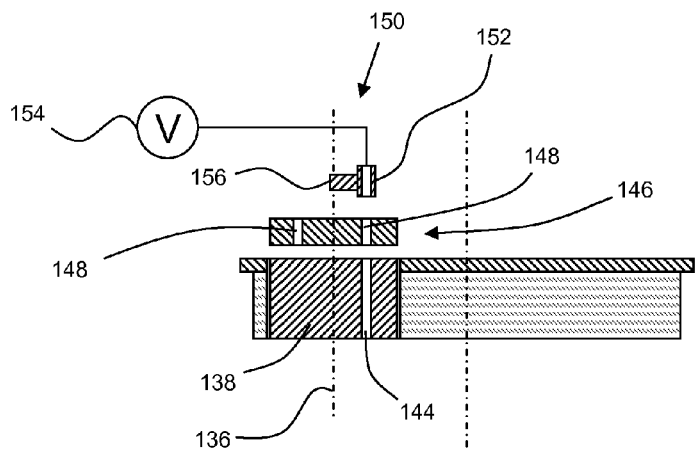
Fig. 7

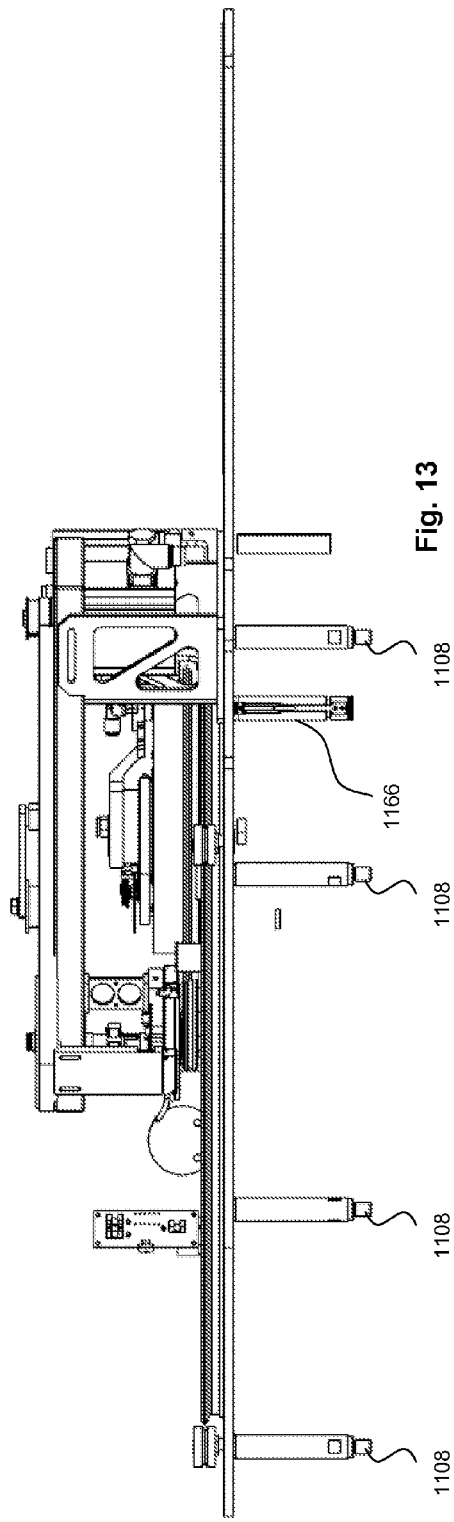
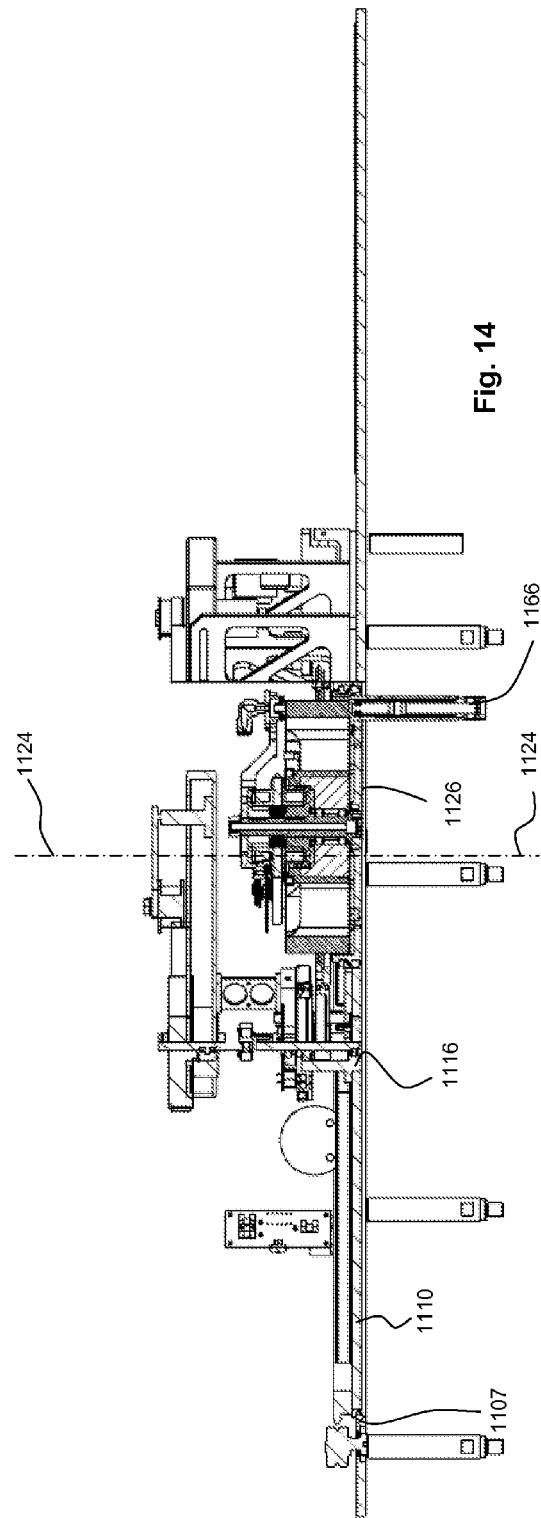

STORAGE APPARATUS

PRIORITY CLAIM

This application claims priority to British Application GB 1208215.2, filed May 10, 2012 and to British Application GB 1210564.9, filed Jun. 14, 2012.

BACKGROUND AND SUMMARY

The present invention is concerned with a storage apparatus in which a plurality of individual items are stored and can be selectively accessed as required. In particular, the present invention is concerned with a storage apparatus in which chemical or biological samples are stored in a temperature controlled, sealed environment, and can be selectively deposited in, and removed from, the storage apparatus.

By "temperature controlled environment" we mean both environments below ambient (e.g. low temperature storage) and above ambient (e.g. incubators).

It is known to provide storage for chemical or biological samples. Such storage facilities are designed to store chemical or biological samples for long periods of time. In order to avoid degradation, such samples are stored at very low temperatures-typically in the order of minus 20 degrees down to minus 80 degrees Celsius and even lower. It is desirable to minimise the amount of space such storage facilities use, because laboratory space is often at a premium. Also, refrigeration to such temperatures uses energy, and because it is desirable to store many such samples, they are usually stored in a high density arrangement to minimise volume, and therefore maximise energy efficiency. The downside of high density storage is that it makes access to a single sample problematic, particularly if it lies in the centre of the storage arrangement. Access to a single sample requires movement of the surrounding samples, which may necessitate bringing them into a higher temperature environment, which is undesirable.

Some known devices utilise a Cartesian (XYZ) robot system to select individual items from a high density array. In such systems the robot is positioned within a cold zone. Typically such a zone will be at minus 20 degrees Celsius. Groups of samples can be extracted from the storage chamber (at, say, minus 80 degrees Celsius) via a simple mechanism individual items can then be selected and moved to ambient for examination. It is difficult to access an individual sample without exposing the surrounding samples to higher temperatures (either minus 20 degrees or ambient). Disadvantageously, placing the robot in a cold zone means that not only does the robot have to function in such an environment, it becomes difficult to service. It also means that the cold storage container has to be large, which is inefficient as energy must be expended keeping the robot at a low temperature, as well as the samples.

What is required is a storage apparatus which can pick an individual item from a high density container whilst minimising the exposure time of the surrounding items to higher temperatures. What is also required is a picking arrangement which takes up minimal space so it can be placed in the cold zone.

It will be noted that these requirements are apparent in any system where a plurality of items are stored at high density in a controlled environment, when exposure to ambient conditions may be hazardous to the integrity of the item. For example, this may be "clean" storage, storage in an inert gas, or "hot" storage such as an incubator instead of cold storage.

It is an aim of the present invention to provide a storage apparatus which can externally pick individual items from high density storage whilst minimising the exposure of the surrounding items to high temperatures, thus overcoming, or at least mitigating, the disadvantages of the prior art.

According to a first aspect of the present invention there is provided a storage apparatus comprising an array of item storage formations, a first member rotatable with respect to the array about a first axis, a selector mounted on the first member, the selector being rotatable with respect to the first member about a second axis, parallel to and offset from the first axis, the selector comprising an item transfer conduit offset from the second axis, in which the first member and the second member are configured for rotation about the first and second axes respectively to selectively align the item transfer conduit with one of the array of item storage formations to extract the item from the array.

By "transfer conduit" we mean a passage, conduit, bore or orifice through which items can pass.

Advantageously, the provision of such a system using an epicyclic selector provides fast access to an annular array of item storage formations. The fact that the first member and the selector are rotatable to position the transfer conduit makes them easier to seal against a tank wall. The epicyclic mechanism is also very compact compared to traditional Cartesian systems, which require a lot of space, and in particular extend outside the workspace (for mounting and actuating the rails or racks).

Preferably a temporary storage unit, or "catcher", is mounted proximate the selector, the temporary storage unit defining a plurality of chambers for temporary storage of items. The temporary storage unit is preferably in communication with the transfer conduit on the opposite side of the selector to the tank, and is movably mounted relative to the selector to place the transfer conduit in communication with an individual one of the plurality of chambers. Advantageously, should the items stored in the volume be vertically stacked (i.e. parallel to the axes), the items on top of an item of interest can be extracted and stored in the temporary storage unit before the item of interest is extracted. The temporarily stored items can then be returned to the array.

Preferably the temporary storage unit is mounted for concentric rotation with the selector, and in which each of the plurality of chambers is disposed at the same distance from the second axis as the transfer conduit. This allows quick access to each of the chambers, and permits the item at the top of the stack to be quickly deposited in the catcher through the transfer conduit.

Preferably the chambers in the temporary storage unit are closed at one end by the selector when not in communication with the transfer conduit. Advantageously, this circumvents the need to provide some kind of clamp or catch to hold them in place. Each item will sit in its chamber until the chamber passes over the transfer conduit, at which point it may drop back into the array.

Preferably a low pressure source is used in fluid communication with the item transfer conduit to selectively suck items into the item transfer conduit from the array. The low pressure source is provided on the other side of the temporary storage unit to the selector such that the low pressure source selectively sucks items through the transfer conduit into the chamber in fluid communication with the transfer conduit. Advantageously, this means that mechanical engagement with each item or sample is not required. The fact that the system "sucks" the items from the volume also prevents the introduction of heat to the items by conduction, and instead surrounds them in cold air.

Because the low pressure source removes air from the volume, an aperture is provided to feed replacement air into the chamber. This air may be ambient (and then cooled by the cooling system of the tank) or pre-cooled using a refrigeration unit.

Preferably, the transfer conduit in the selector comprises an inlet seal, which seal bears against the array (or an array plate) of item storage formations. The seal preferably comprises an annular member rotatably (preferably spherically) mounted within the inlet. This allows the seal to better conform to, and form a substantially airtight seal with, the array plate. Preferably the seal forms a spherical joint with the selector, preferably via a part spherical surface engaging the inlet for this purpose.

Preferably an insulation layer is provided in the lid, and the temporary storage unit is positioned on the array side of the insulation layer. Preferably the first member comprises a first part of the insulation layer, and the temporary storage unit comprises a second part of the insulation layer, which first and second parts are adjacent to form a substantially contiguous insulation layer.

Advantageously, this keeps the temporarily stored items in the cold zone.

Turning to the array, it preferably comprises a plurality of elongate conduits parallel to the first and second axes, the selector being configured to selectively place each of the elongate conduits in communication with the transfer conduit or passage. The plurality of elongate conduits may be provided within pipes. Preferably the items are configured for axial sliding motion within the conduits or pipes. Samples can be "stacked" in the pipes. In order to maximise the available range of the system, preferably the array is annular about the first axis.

Preferably the array is annular about the first axis.

Preferably there is provided a plurality of items in the form of containers configured for axial sliding motion within the conduits.

Preferably the first member is rotatably mounted in a circular receiving formation of the tank, preferably in the tank lid or top plate. An annular running seal may be provided between the circular receiving formation and the first member.

The first member preferably comprises a layer of insulation material, which layer of insulation material defines a plurality of slits or recesses defined at least partially therethrough and facing the array. Because the layer of insulation is subject to a high temperature gradient (20 degrees ambient to minus 80 degrees inside the tank), thermally induced strains will try to develop, which could induce bending stresses in the first member. The slits allow the insulation to deform in small sections, reducing the bending stresses.

Preferably a separate access chamber is provided for the insertion and removal of items into and out of the array. This allows the picking mechanism to be sealed. Preferably the access chamber is in communication with a loading conduit which can be selectively placed in communication with the item receiving formation. Preferably the loading conduit forms part of the array. This allows the apparatus to load and unload items within its normal range of movement.

According to a second aspect of the invention there is provided a method of extracting an item from a storage apparatus comprising the steps of providing an array of items within a storage apparatus, providing a first member rotatable with respect to the array about a first axis, providing a selector rotatable with respect to the first member about a second axis, parallel to and offset from the first axis, the selector comprising an item transfer conduit, rotating the first member and the second member about the first and second axes respectively to align the item transfer conduit with an item to be extracted, using the selector to extract the item from the array.

As with the first aspect, the method uses an epicyclic selector to provide fast access to an annular array of item storage formations. The fact that the first member and the selector are rotated to position the item receiving formation makes them easier to seal against a tank wall.

Preferably the method further comprises the step of providing a low pressure source, using the low pressure source to suck the item into the item transfer conduit.

Further, the following steps are preferably part of the method providing a temporary storage unit, using the selector to extract multiple items from the array, temporarily storing the multiple items in the temporary storage unit, returning at least one of the multiple items to the array using the selector.

According to a third aspect of the invention, there is provided a suction apparatus for a storage apparatus comprising a conduit for the passage or storage of items, the conduit having an inlet, which suction apparatus comprises a seal member comprising a convex outer surface bearing against the conduit inlet to permit articulation of the seal member in use. Preferably, the convex outer surface is part spherical. The conduit may be provided with a part spherical concave formation to receive the seal member. Advantageously, this configuration allows the seal to better conform to the surface around orifices in an array in which items or samples may be stored, and thereby effect a better seal.

BRIEF DESCRIPTION OF THE DRAWINGS

An example storage apparatus in accordance with the present invention will now be described with reference to the accompanying drawings in which:

FIG. 6*a* is a schematic plan view of a part of the storage apparatus of FIG. 1;

FIG. 6*b* is a schematic plan view similar to FIG. 6*a* in a different position;

FIG. 7 is a schematic section view through line VII-VII in FIG. 6*a*;

FIG. 13 is a side view of the part of the storage apparatus of FIG. 10;

FIG. 14 is a side section view of the part of the storage apparatus of FIG. 10 along the line XIV-XIV in FIG. 12;

FIG. 16a is a first side view of a part of the storage apparatus of FIG. 8;

FIG. 16b is a second side view of the part of FIG. 16a;

DETAILED DESCRIPTION

Figure 1:
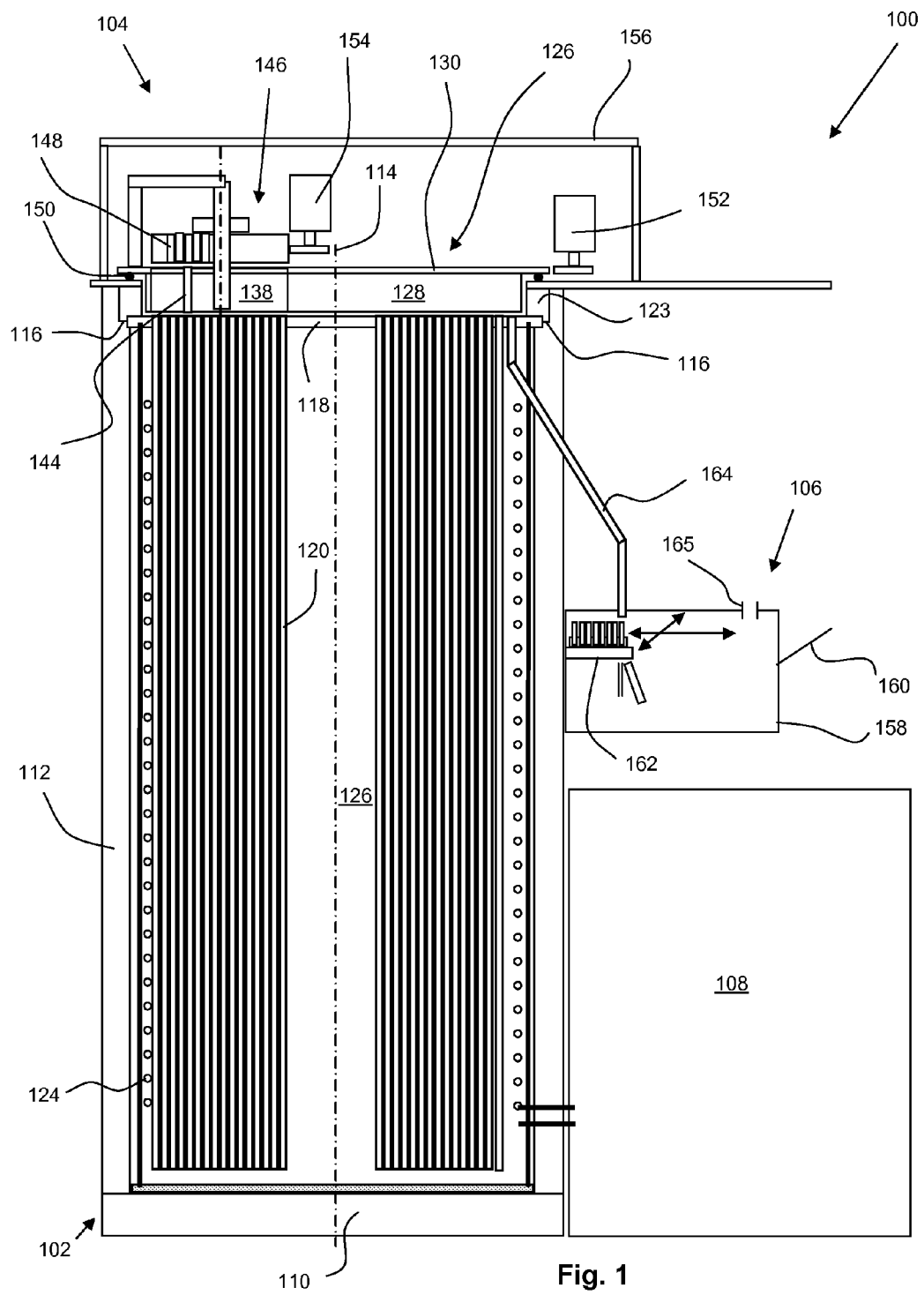
FIG. 1 is a schematic section view of a first storage apparatus in accordance with the present invention.

As shown in FIG. 1, there is provided a storage apparatus 100 in accordance with the present invention. The storage apparatus 100 generally comprises a refrigerated tank 102, a picking apparatus 104, an access system 106, and a refrigeration unit 108.

The refrigerated tank 102 comprises a base 110 and an annular insulated side wall 112 in the form of a cylinder about a central axis 114. The side wall 112 terminates in an annular shoulder 116 at an upper end, on which an array plate 118 sits.

The array plate 118 comprises a plurality of through bores arranged in an annular array formation about the axis 114. Each of the through bores has a sample tube 120 installed therein, depending from the plate 118 such that each tube extends into the tank 102.

Figure 2:
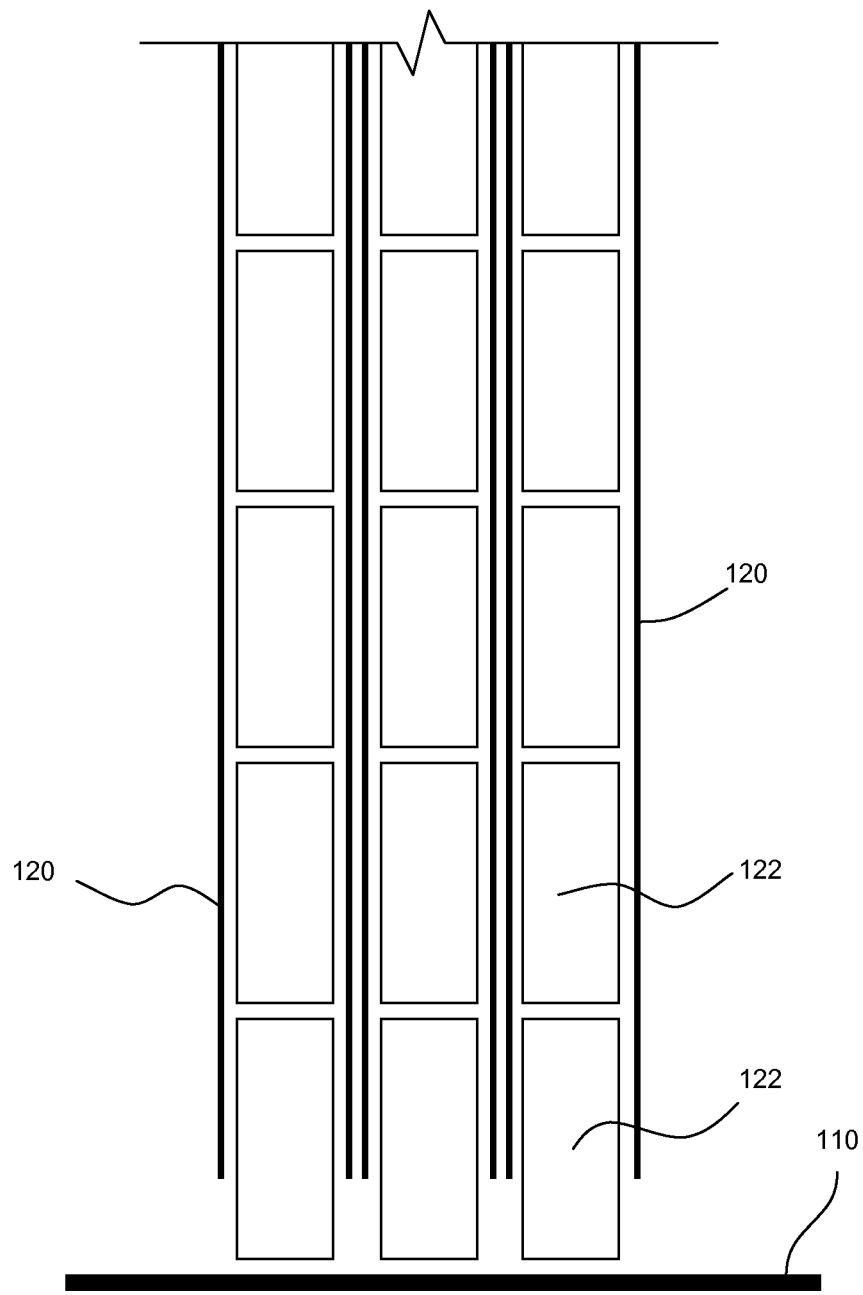
FIG. 2 is a detailed schematic section view of a part of the storage apparatus of FIG. 1.

Turning to FIG. 2, a series of three sample tubes 120 are shown in section. As can be seen, each example tube 120 contains sufficient space for the stacking of a plurality of sample containers 122 which are generally cylindrical in shape. It will be noted that each of the sample tubes 120 does not extend all the way to the base 110, but instead stops short by a distance less than the length of a single sample container 122, as shown in FIG. 2. This allows air to be replaced in each tube 120 when a sample is sucked out (described below), and also ensures that the position of the tubes 120 is determined by their alignment with the array plate 118, to ensure they are all at the same level. The lack of contact with the bottom of the base 110 also insulates the sample tubes 120 and therefore the majority of the samples 120.

Turning back to FIG. 1, an annular clamping ring 123 is placed over the periphery of the array plate 118 as shown in FIG. 1 so as to secure it against the shoulder 116.

The refrigerated tank 102 further defines a series of cooling channels 124 proximate the side wall inner periphery, which are cooled by the refrigeration unit 108 in order to maintain the temperature within the tank at a low level, typically minus 80 degrees Celsius. The tank 102 defines a volume 126 which is kept at this controlled temperature.

The picking apparatus 104 comprises a first member in the form of a tank lid 126. The tank lid 126, shown in more detail in FIG. 4, comprises a first cylindrical layer of insulating material 128 and a circular top plate 130, having a radius larger than the insulating material 128, and therefore projecting radially outwardly therefrom. The top plate 130 and insulating material 128 define a central axis 132. Offset from the central axis 132, a through bore 134 is defined having an offset axis 136 in the centre thereof.

Figure 4:
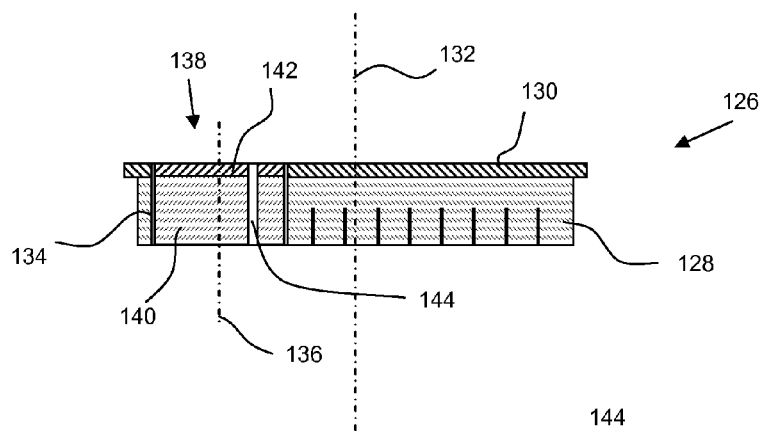
FIG. 4 is a schematic side section view through the line IV-IV in FIG. 3.

Within the through bore 134 there is provided a cylindrical selector 138, as shown in FIG. 4. The selector 138, like the lid 126 comprises a layer of insulating material 140 and a top plate 142, each of equal diameter about the offset axis 136. A passage 144 is defined through the insulating material and top plate 140, 142, and is parallel to, but offset from, both the main axis 132 and the offset axis 136.

A catcher 146 is provided, as shown in FIGS. 6a to 7. The catcher 146 is generally circular and defines a plurality of chambers 148 in the form of through axial bores. The chambers 148 are disposed at an equal radius in a circular fashion about the centre of the catcher 146.

A suction apparatus 150 (not shown in FIG. 1) is also shown in FIG. 7 and comprises a suction hose 152 connected to a vacuum source 154, so as to selectively apply a negative pressure to the suction hose 152. The suction hose 152 is rotatably mounted on an arm 156.

The picking apparatus 104 is assembled as follows.

The tank lid 126 is installed in the open end of the refrigerated tank 102 above the array plate 118. The tank lid 126 is sealed against the side walls 112 with the use of a ring seal 150. The lid 126 can be rotated about the main axis 132 (which is coincident with the axis 114 of the tank). The lid 126 can be driven in rotation about the main axis 132 by the use of a motor 152 (in a known manner, the details of which will not be described here).

Figures 5A, 5B:
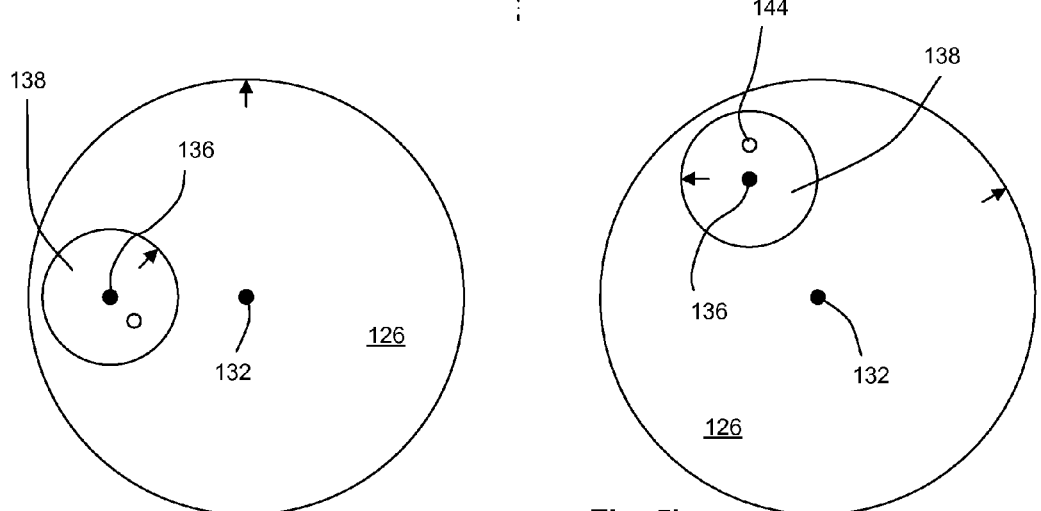
FIG. 5*a* is a schematic plan view, similar to FIG. 3*a* but in a different position.
FIG. 5*b* is a schematic plan view similar to FIGS. 5 and 5*a* but in a further different position.

The lid 126 can therefore be rotated, for example, from the position shown in FIG. 5a to that shown in FIG. 5b.

The selector 138 is installed for rotation about the offset axis 136 within the through bore 134 of the lid 126. The selector 138 can also be driven in rotation about the axis 136 by a motor 154. As such, the passage 144 can be positioned over any one of the annular array of bores defined in the array plate 118 by combined rotation of the lid 126 and selector 138 to access any of the sample tubes 120.

Figure 3:
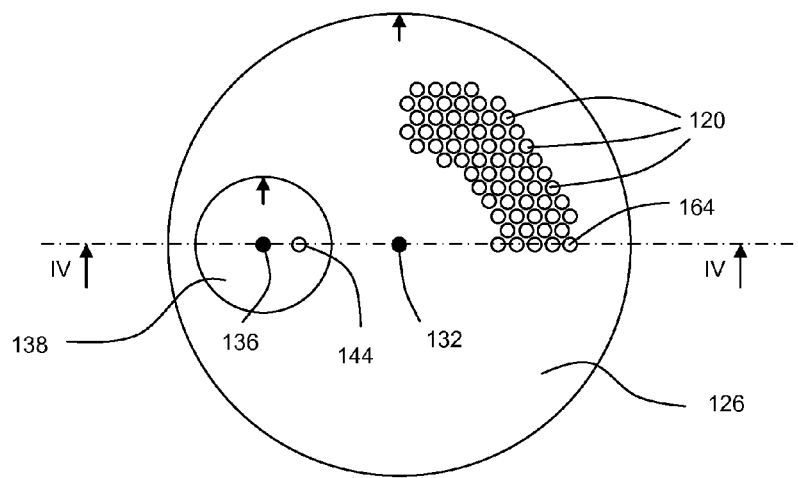
FIG. 3 is a schematic plan view of a part of the storage apparatus of FIG. 1.

Referring to FIG. 3, a 90 degree sector of the array of sample tubes 120 is shown by way of example. The selector 138 can be driven in rotation independent to the lid 126 by the use of the motor 154. FIGS. 3, 5a and 5b each show the selector 138 is different positions about the offset axis 136.

The catcher 146 is mounted above the selector 138 for concentric rotation about the offset axis 136. In this way, any of the chambers 148 can be aligned with the passage 144 by driving the catcher 146 in rotation, relative to the selector 138 about the offset axis 136.

The motor 154 is arranged to drive the catcher 146. A clutch is provided to selectively form a load path between the catcher 146 and the selector 138. Therefore the catcher 146 and the selector 138 can be driven together (when the clutch is engaged) to position the passage 144 over the desired tube 120. The clutch can be disengaged to rotate the catcher 146 relative to the selector 138 to then place the required chamber 148 in communication with the passage 144.

The arm 156 is rotatably fixed to the selector 138 such that the two rotate together either side of the catcher 146. Therefore the suction hose 152 is always aligned with the passage 144. One of the chambers 148 is therefore usually in fluid communication with both the suction hose 152 and the passage 144.

Negative pressure can be selectively applied by the vacuum pump 154, thus sucking the top sample 122 from the sample tube 120 through the passage 144 and into the chamber 148. The catcher 146 can then be rotated to place another chamber 148 in communication with the passage 144. As the catcher 146 is rotated, the negative pressure in the chamber 148 containing the sample rises, releasing the sample, but by the time the sample drops from the hose 152, the bottom of the chamber 148 is sealed by the top of the selector 138. The sample 122 is therefore temporarily stored in the catcher 146.

The next sample may then be extracted from the tube 120 aligned with the passage 144. This process may continue until a target sample is stored within the catcher 146. All of the samples 122 which were above the target sample can be quickly deposited back into the tube 120 by indexing the catcher 146 to release them under gravity from the chambers 148 through the passage 144 and into the tube 120 with the vacuum pump 154 deactivated. The end result is that only the target sample container is isolated within the catcher 146.

In an alternative method, instead of temporarily storing each sample 122 in the catcher until the target sample is extracted, the picking apparatus may be used to deposit each sample above the target sample into an alternative tube 120 as they are picked. The apparatus picks a sample, deposits in a spare tube, moves back to the target tube, picks a further sample, deposits the further sample in the spare tube and so on until the target sample is extracted. In a preferred method, the catcher would hold a cache of 5 to 10 samples before depositing them in the spare tube. In this manner, the samples above the target sample are held at a high temperature for the shortest time possible.

The entire picking apparatus 104 is enclosed by an enclosure 156 which keeps it in a controlled environment. It is not envisaged that the enclosure 156 is set at a similar temperature to the refrigerated tank 102, however, the environment will be controlled so as to minimise external factors affecting the samples temporarily held within the catcher 146. In particular, the humidity of the air inside the enclosure 156 is controlled to make sure it is dryer than ambient to minimise degradation of the samples 122 temporarily held within the catcher 146.

The lid 126, catcher 146 and selector 138 can be operated at high speed in order to make the time which the samples are spent therein and in the environment of the picking apparatus 104 minimal. The lid 126, selector 138 and the catcher 146 all have rotary encoders mounted thereon (not shown) which measure their rotation and allow a control system to accurately position them over the target tube 120.

In order to keep the picking apparatus 104 isolated from the ambient environment, the access system 106 is provided. The access system 106 comprises an enclosure 158 having an access door 160 for the insertion and removal of samples. Samples can be added or removed on an XY tray 162 which is arranged to be actuated in X and Y directions within the access system 106. After loading the XY tray 162, the enclosure 158 is sealed and purged with an inert gas to expel ambient air and water vapour through a vent 165.

A loading conduit 164 is provided above the XY tray 162. The XY tray 162 can be can be moved to place any of the samples held therein directly adjacent the end of the conduit 164. As shown in FIG. 1, the loading conduit 164 is routed through the refrigerated tank 102 and to the base of the array plate 108 where it forms part of the array of orifices (as indicated in FIG. 3).

In this way, a target sample 122 temporarily stored in the catcher 146 can be released into the conduit 164 and thereby the tray 162 for removal by an operator. Similarly, a sample within the tray 162 can be added to the tank 102 by using the conduit 164 to suck it into the catcher 146 in the same way as the samples are removed from the tubes 120. The picking apparatus 104 and samples can therefore be retrieved and deposited within the access system 106 as required. This ensures that there is minimal transfer of air from the exterior of the apparatus to both the picking apparatus 104 and the refrigerated tank 102.

Turning to FIGS. 8 to 15, a more detailed storage apparatus 1000 is shown, operating in a similar manner to the storage apparatus 100.

Figure 8:
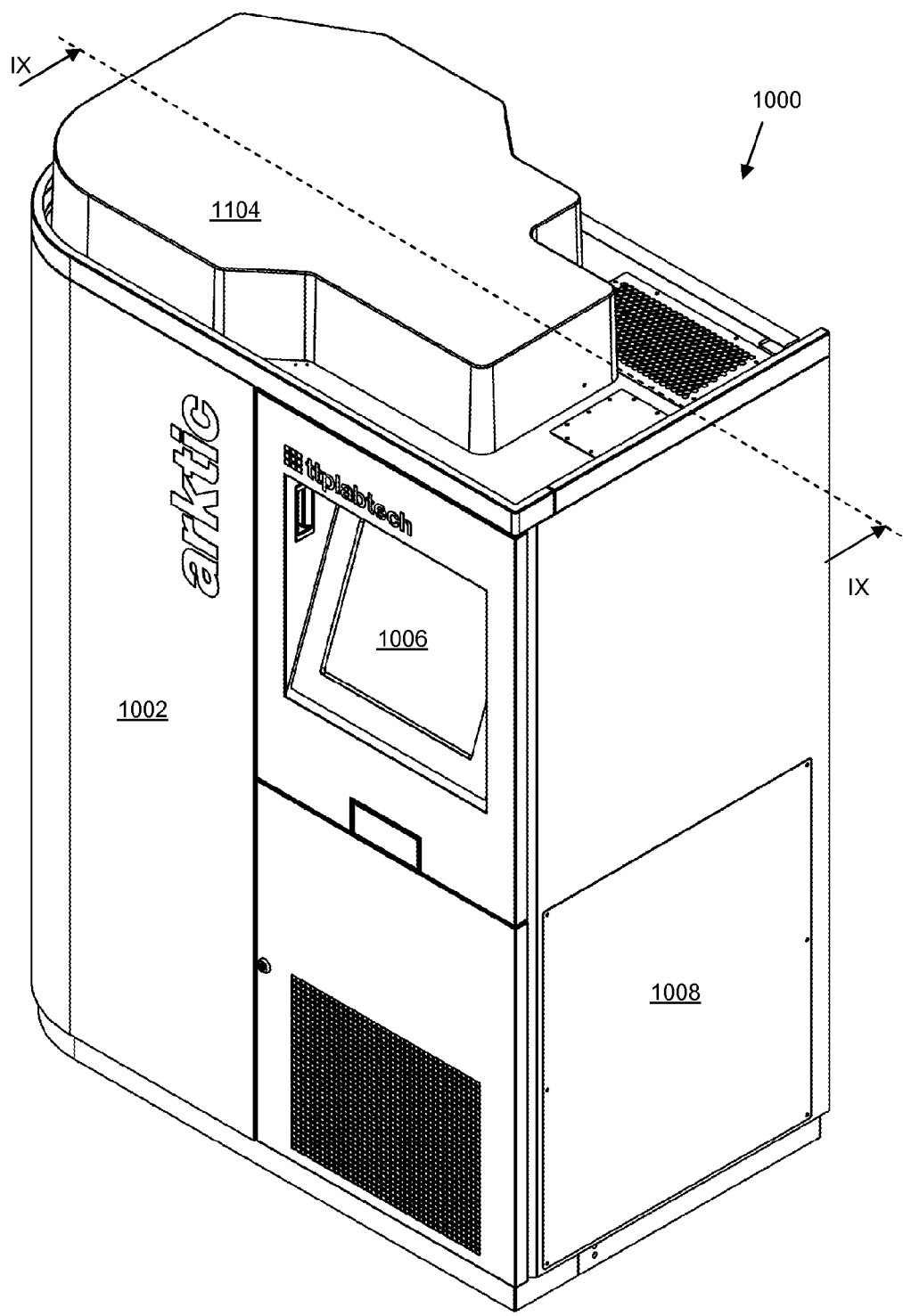
FIG. 8 is a perspective view of a second storage apparatus in accordance with the present invention.
Figure 9:
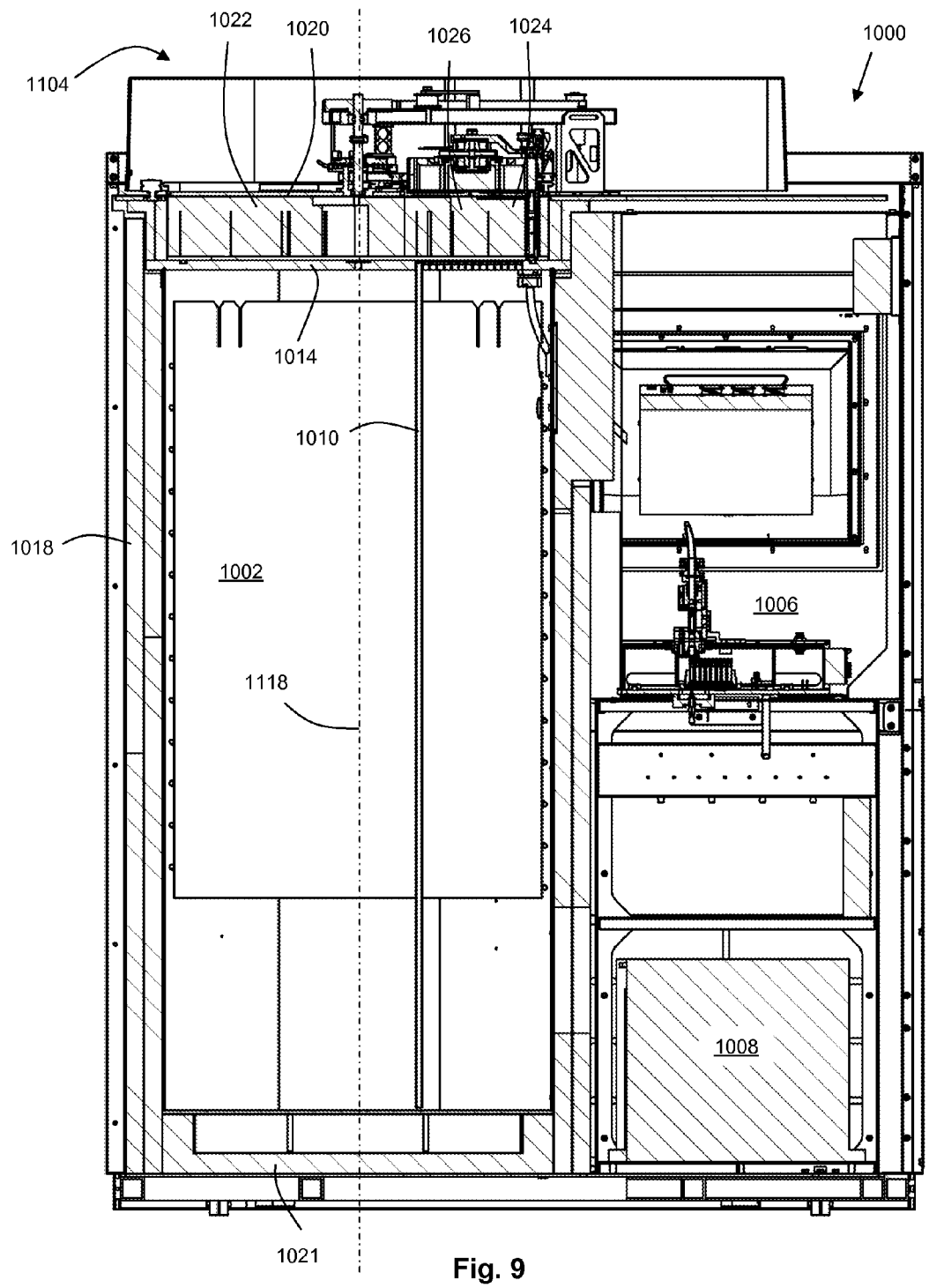
FIG. 9 is a section view of the storage apparatus of FIG. 8 through line IX-IX.
Figure 10:
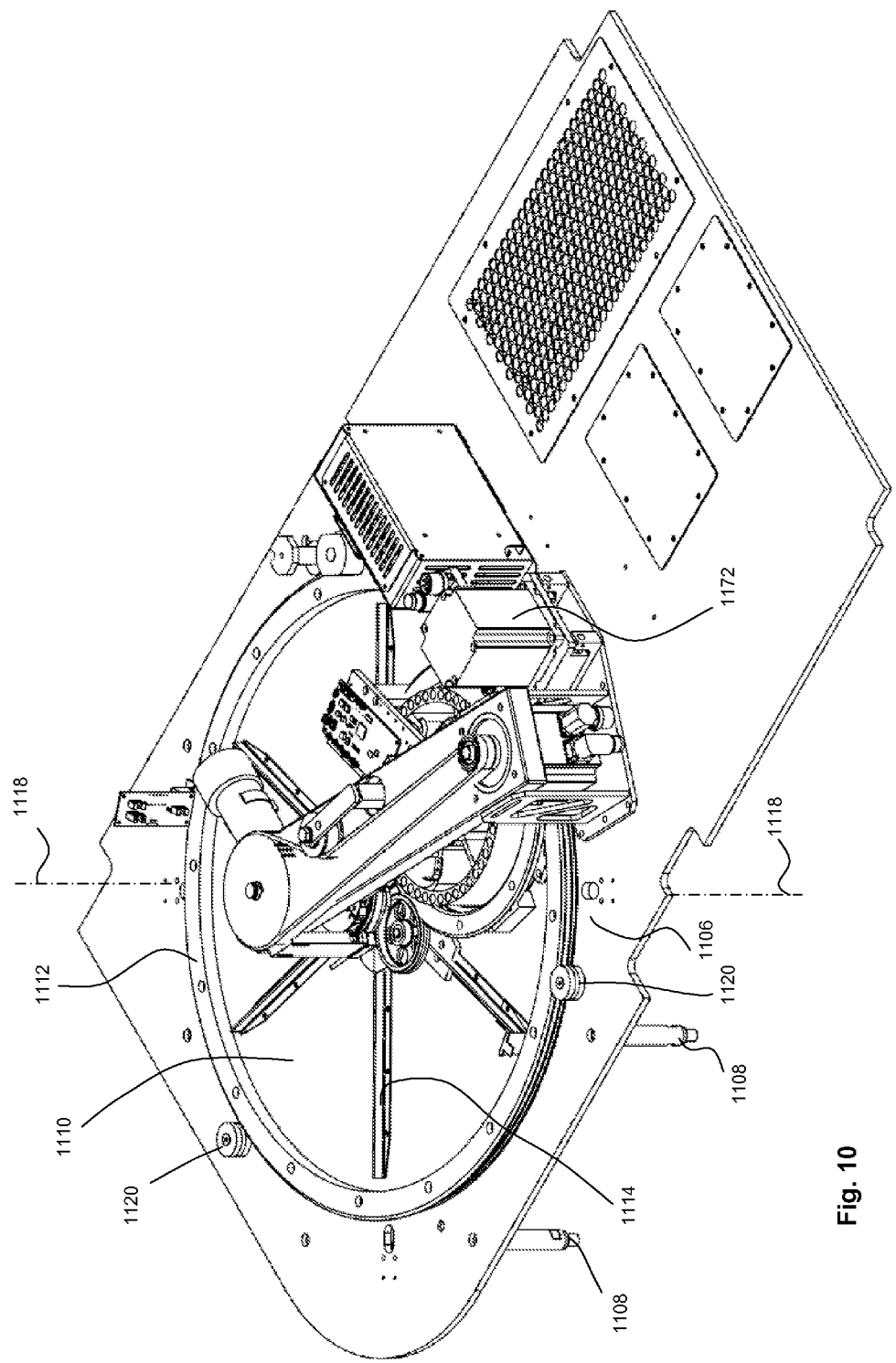
FIG. 10 is a perspective view of a part of the storage apparatus of FIG. 8.
Figure 11:
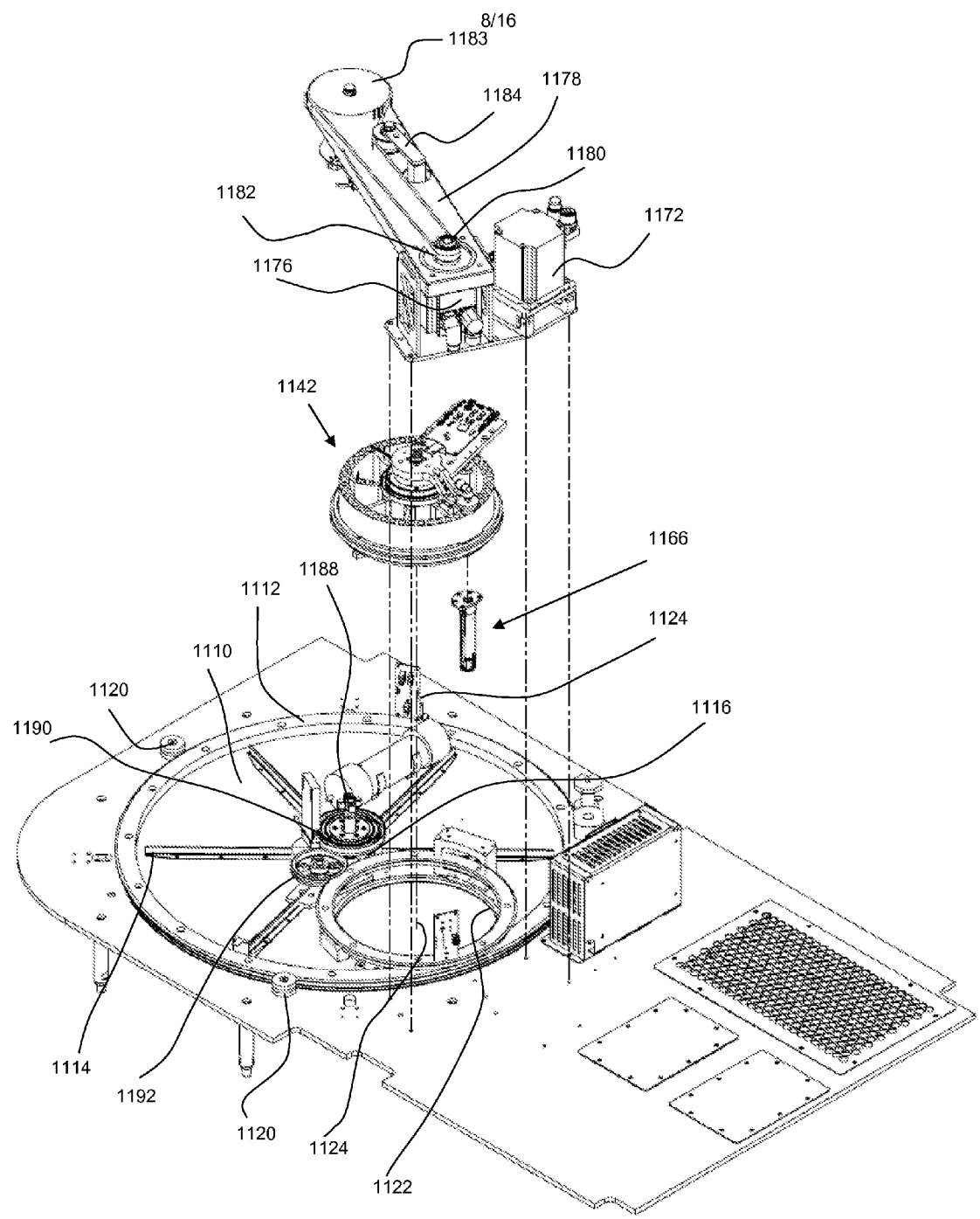
FIG. 11 is an exploded perspective view of the part of the storage apparatus of FIG. 10.
Figure 12:
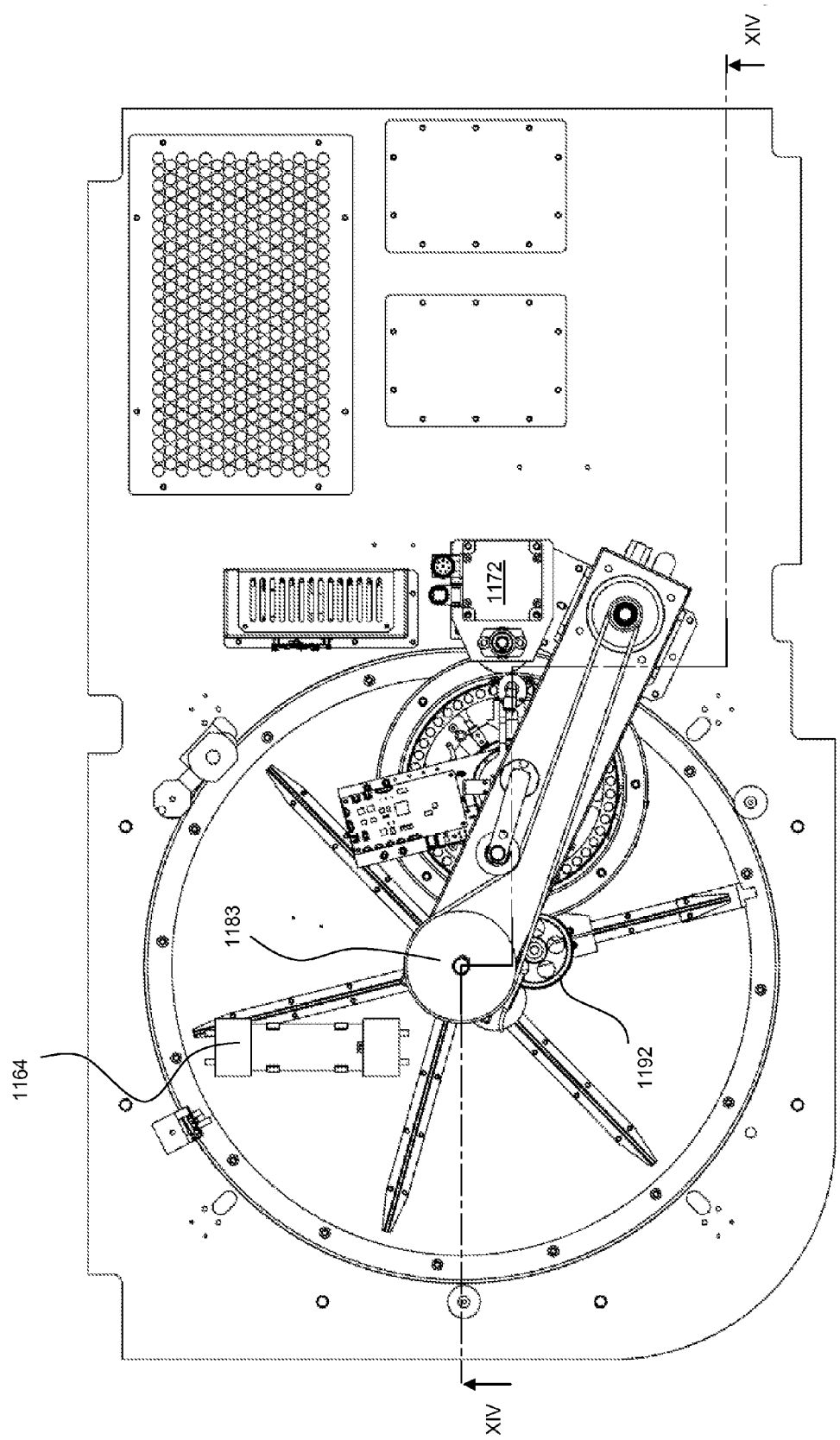
FIG. 12 is a plan view of the part of the storage apparatus of FIG. 10.

With reference to FIGS. 8 and 9, the apparatus 1000 comprises a refrigerated tank 1002, a picking apparatus 1104, an access system 1006, and a refrigeration unit 1008. The general configuration and operation of the apparatus 1000 is the same as the apparatus 100.

Specifically, the tank 1002 defines a main axis 1118 and contains a plurality of sample tubes 1010 disposed in an annular array about the axis 1118. An array plate 1014 holds them in place. The tank 1002 comprises a tank base 1021, sidewalls 1018 and a lid 1020.

Turning to FIGS. 10 to 15, the picking apparatus 1104 is shown in more detail.

The picking apparatus 1104 comprises a top plate 1106 which can be installed on the apparatus 1000 via downwardly depending pins 1108. The top plate 1106 defines a circular orifice 1107 with roller assemblies 1120 positioned about the circumference.

The tank lid 1020 comprises a layer of insulating material 1022 with a circular plate 1110 positioned thereon. As with the apparatus 100, the tank lid 1020 comprises a selector 1024 for relative rotation, as will be described below. The selector 1024 also comprises a layer of insulating material 1026 with a circular plate 1126 thereon.

The circular plate 1110 comprises an upwardly projecting rim flange 1112 and six radially extending stiffening ribs 1114. The plate defines a hub 1116 at a main axis 1118. A centre shaft 1188 projects upwardly from the hub 1116 in-line with the main axis 1118. The centre shaft 1118 is freely rotatable with respect to the plate 1110. The plate 1110 defines a circular orifice 1122 offset from the main axis 1118, the orifice 1122 defining an offset axis 1124 parallel with the main axis 1118.

Figure 14A:
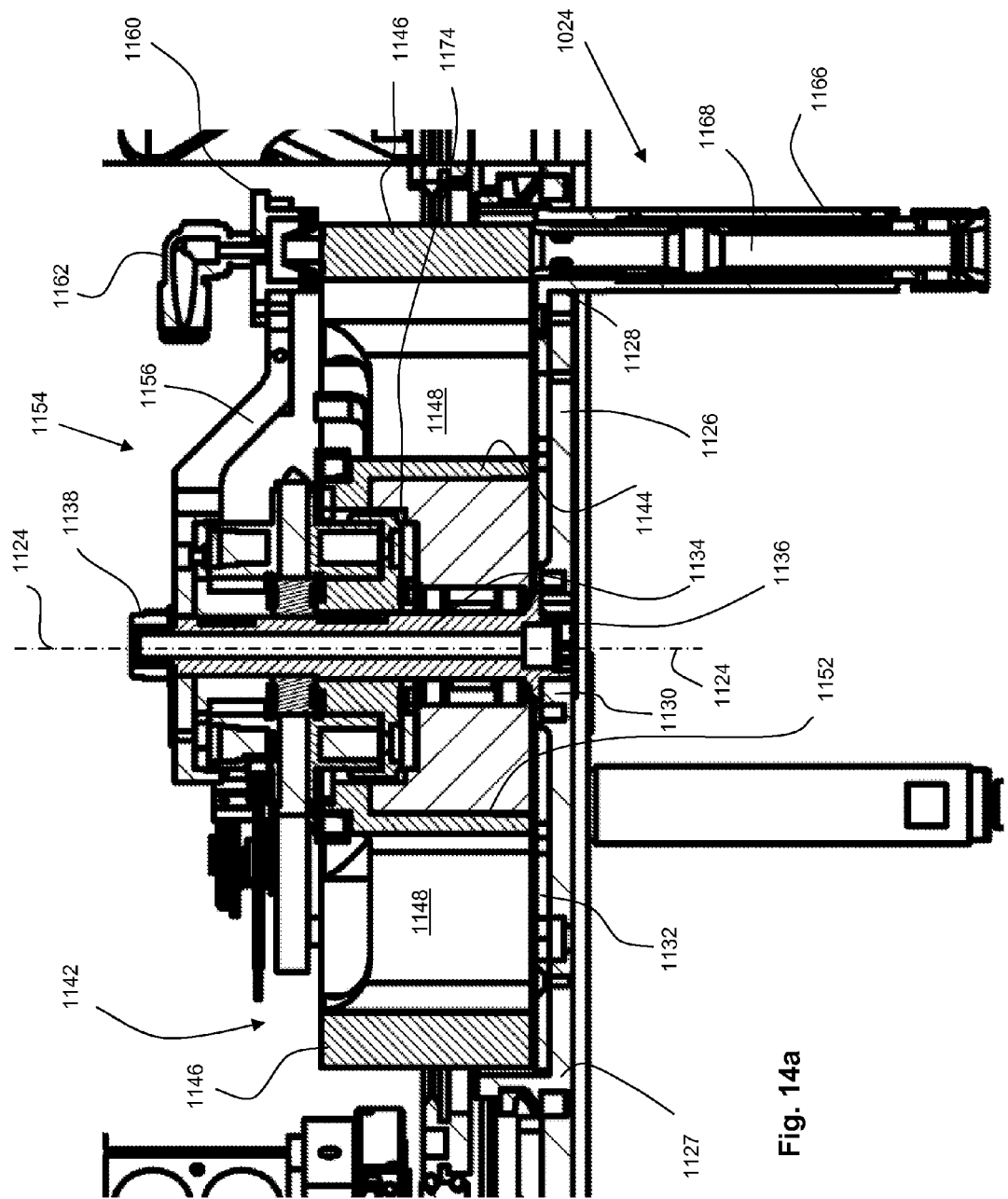
FIG. 14*a* is a detail view of a part of FIG. 14.
Figure 14B:
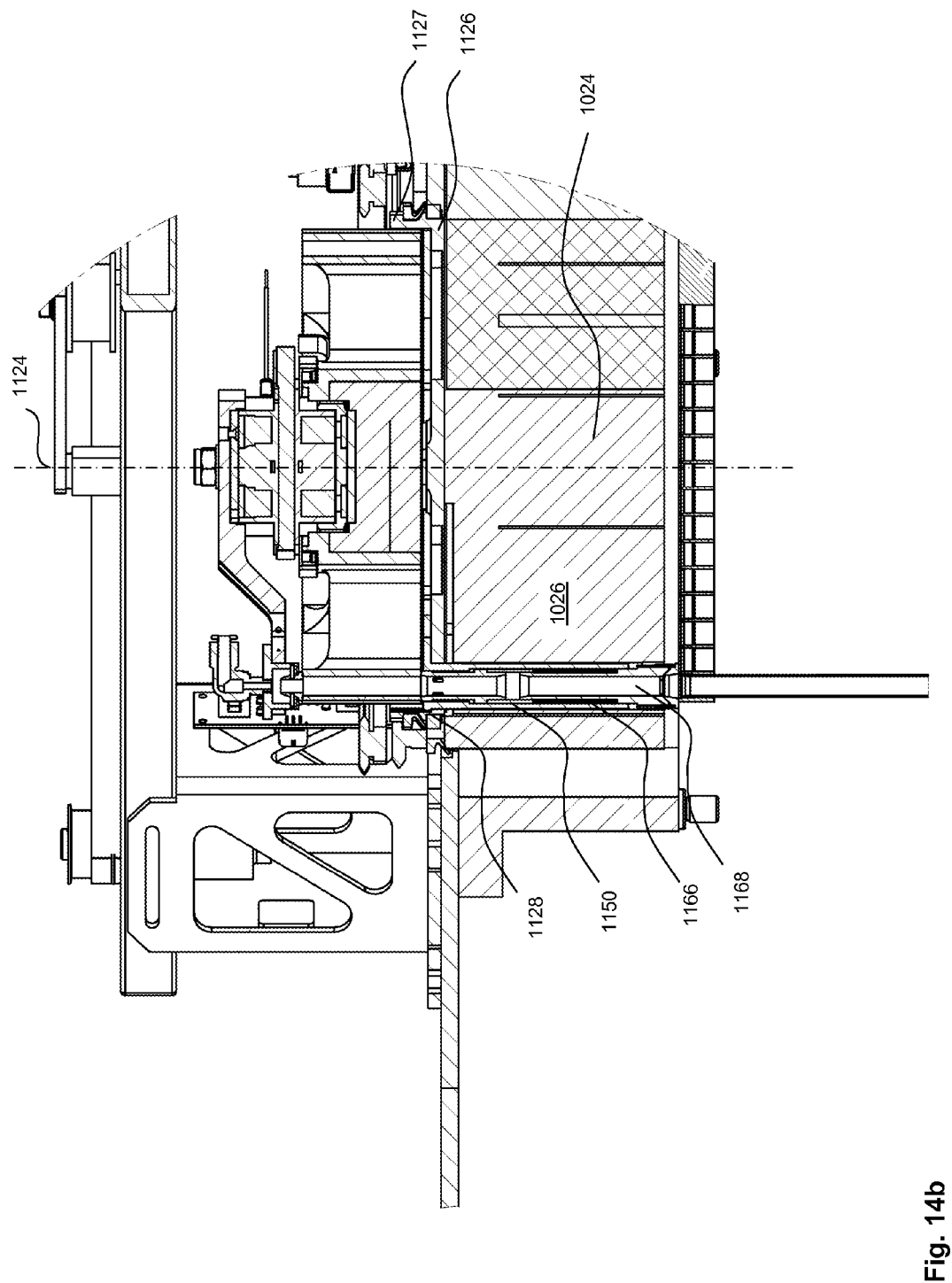
FIG. 14b is a detail view akin to that of FIG. 14a, in a different configuration.
Figure 15:
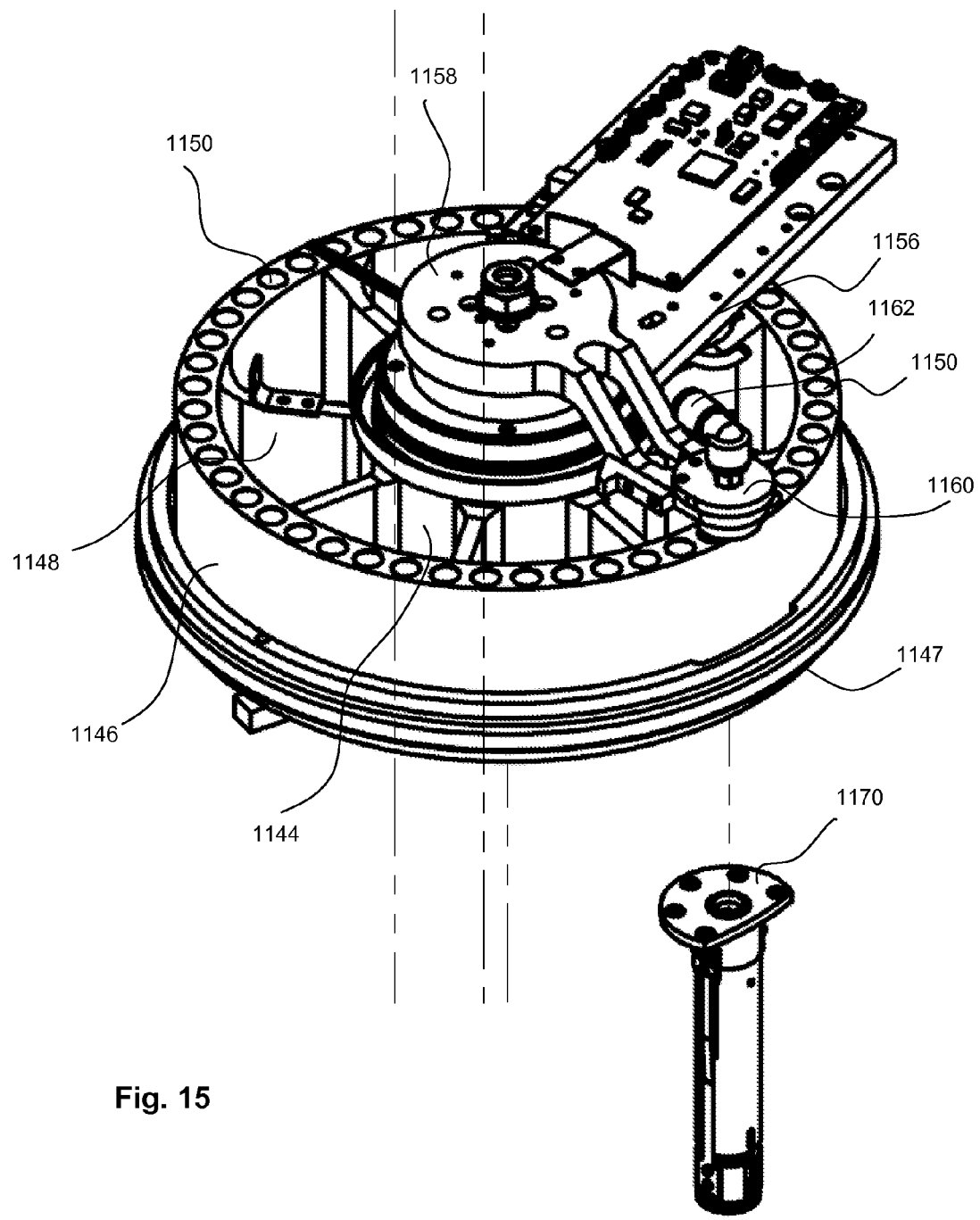
FIG. 15 is an exploded perspective view of a part of the storage apparatus of FIG. 8.

The circular plate 1126 of the selector 1024 in section is shown in FIGS. 14*a* and 14*b*, with its centre at the offset axis 1124 (NB the insulation material 1026 is not shown in FIG. 14*a*). FIGS. 14*a* and 14*b* are shown at different positions of the lid 1020 about the main axis 1118, and the selector 1024 about the offset axis 1124. The plate 1126 defines a flange 1127 at its periphery, spaced from the axis 1124. A circular orifice 1128 is positioned at a single location on the periphery of the plate 1126. The plate 1126 defines a hub 1130. A bearing layer 1132 is provided, covering an upper face of the plate 1126.

Figures 16A, 16B:
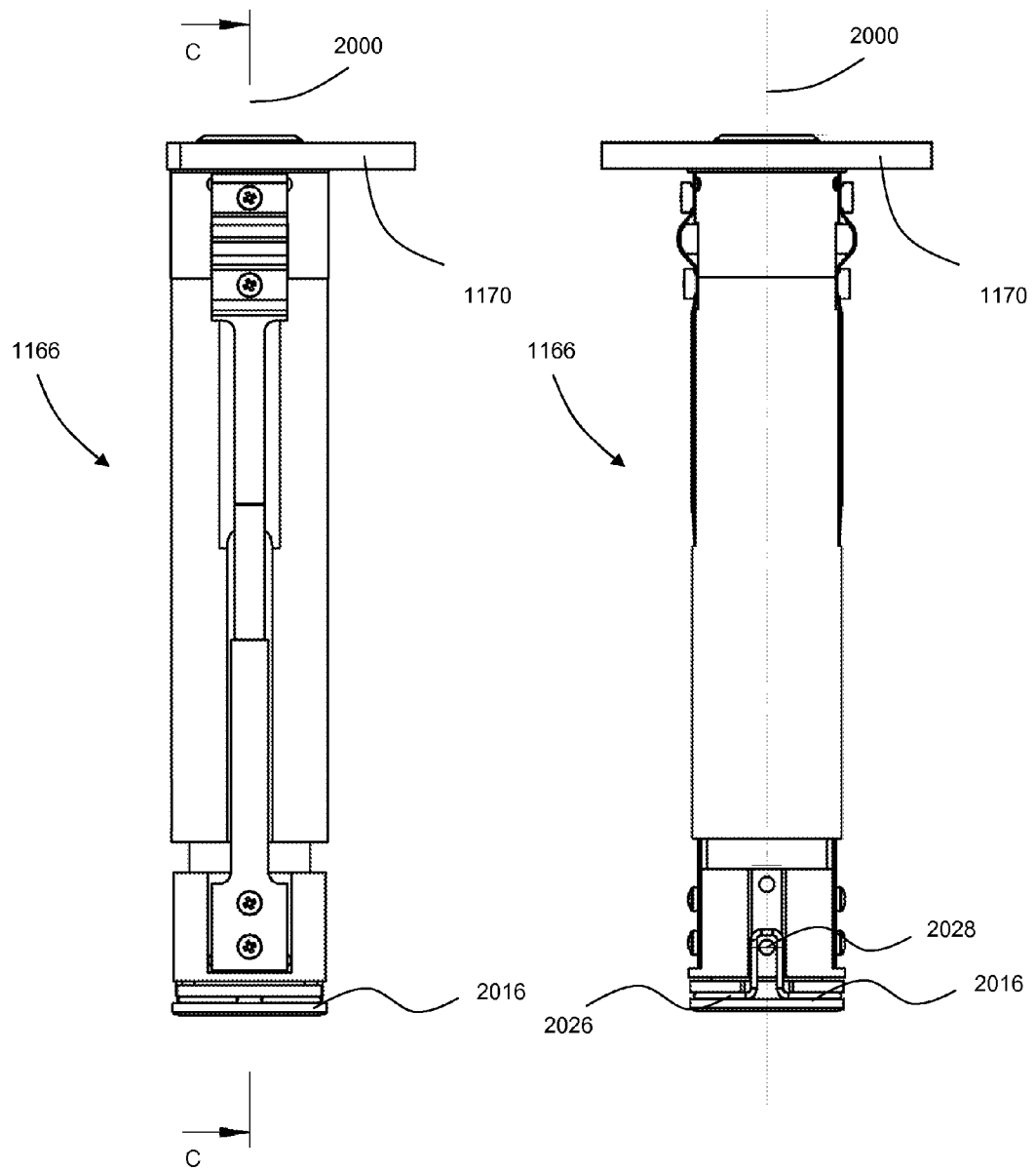
Figure 16C:
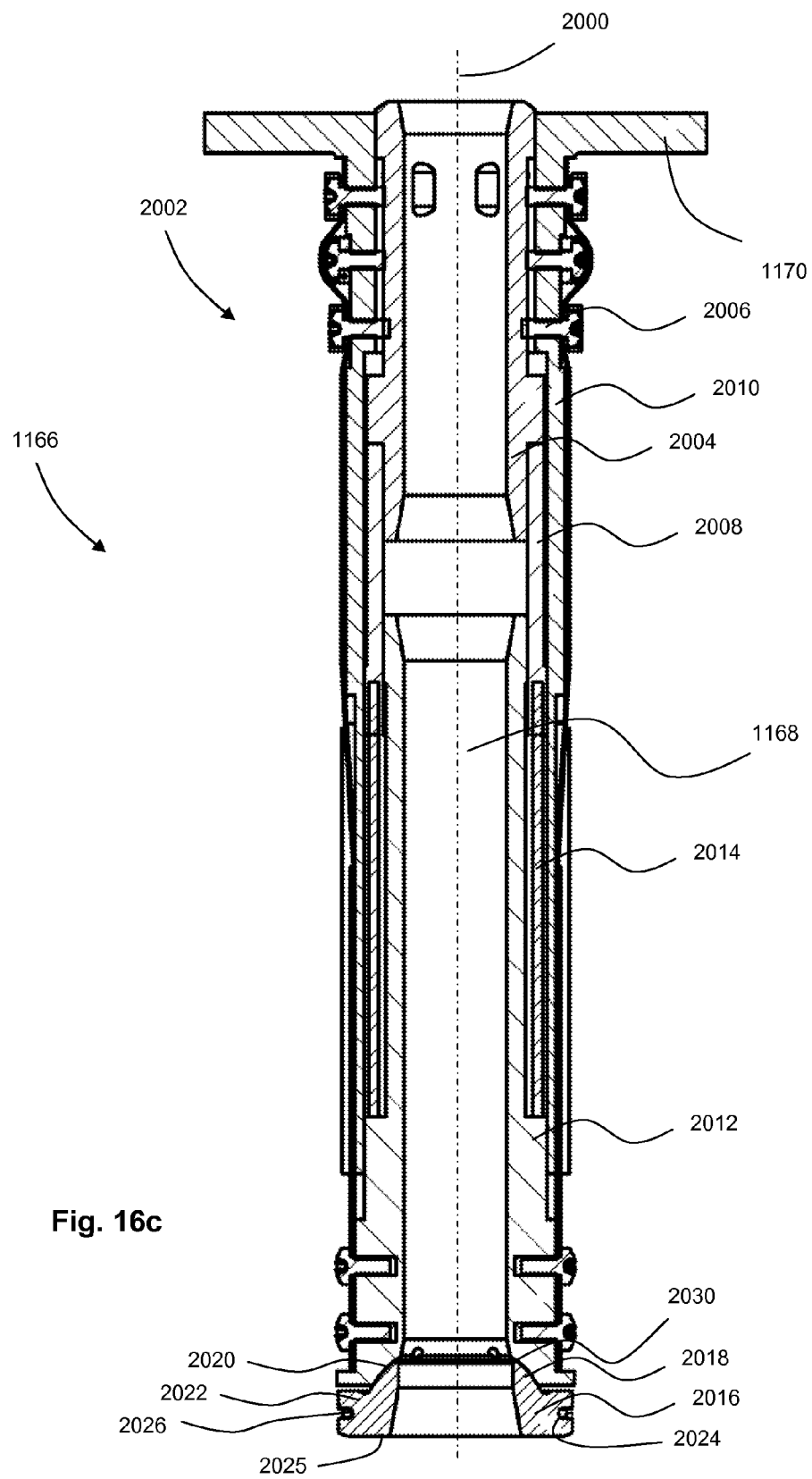
FIG. 16c is a section view of the FIG. 16a along lines C-C.

A sample transfer tube 1166 is provided, and shown in detail in FIGS. 16*a* to 16*c*. The tube 1166 is cylindrical in form about a tube axis 2000 and having a central axial through-passage 1168. At one end, the tube 1166 defines a radial flange 1170. The diameter of the tube 1166 is less than that of the orifice 1128 in the plate 1126.

The tube 1166 comprises a mount 2002 defining the flange 1170 and extending into a tubular section 2010. The mount 2002 is connected to a middle tube 2004 via fasteners 2006. The middle tube 2004 is partly surrounded by a sleeve 2008 which also lies within the tubular section 2010 of the mount 2002. A bottom tube 2012 is provided extending from the mount 2002 and middle tube 2004, but axially movable relative thereto against a resilient member in the form of a compression spring 2014. The provides the tube 1166 with a variable length. The bottom tube 2012 defines a concave axial spherical surface 2030 at its lower end.

At the free end of the bottom tube 2012, a seal member 2016 is provided. The seal member is formed from a low friction wear-resistant material suitable for sliding on the array plate 1014 and also on the spherical surface 2030 of the bottom tube 2012 at low temperatures. PTFE materials such as Rulon (RTM) are suitable for such an application. The seal member defines a truncated spherical portion 2018 about the axis 2000, the spherical portion defining a spherical outer surface 2020. Below the spherical portion 2018, a cylindrical portion 2022 is provided defining an annular recess 2024 and a bearing surface 2025.

A retainer wire 2026 is provided in the recess 2024, as can be seen in FIG. 16b, the retainer wire 2026 extends up to the bottom tube 2012 to attach thereto around pins 2028 for retaining the seal member 2016 during assembly and removal from the lid 1020.

As such, when the seal member 2016 is assembled with the bottom tube 2012, it can rotate about any transverse axis because the spherical surface 2020 bears on the spherical surface 2030 of the lower end of the bottom tube 2012. Therefore the seal 2016 can articulate without causing an air gap between it and the bottom tube 2012.

A drive shaft 1134 is provided having a first end 1136 and a second end 1138.

Turning to FIGS. 11 to 15, a catcher 1142 is provided, being generally circular about the offset axis 1124. The catcher 1142 comprises a hub 1144 connected to a rim 1146 by eight spokes 1148. A plurality of axially oriented chambers 1150 are provided in the rim 1146. The chambers 1150 are positioned at the same radius from the offset axis 1124 as the orifice 1128 in the plate 1126.

The hub 1144 defines a central shaft 1152.

A suction assembly 1154 is provided comprising a radial arm 1156 having a hub 1158 at a first end and extending to a vacuum nozzle 1160 at a second end. The vacuum nozzle 1160 is in fluid communication with a hose adaptor 1162 configured for attachment to a hose (not shown) connected to a vacuum pump 1164.

The picking apparatus is assembled as follows.

The circular plate 1110 of the tank lid 1020 is installed for rotation about the main axis 1118 in the top plate 1106 such that the rim flange 1112 can freely run on the rollers 1120. An annular seal (not visible) prevents any flow of fluid between the top plate 1106 and the periphery of the circular plate 1110.

The tank lid 1020 can be driven in rotation by an appropriately engaged first motor 1172 which drives the rim flange 1112.

The sample transfer tube 1166 is installed within the orifice 1128 of the plate 1126 of the selector 1024 such that the flange 1170 abuts the top surface of the plate 1126, flush with the bearing layer 1132. The bearing surface 2025 of the seal 2016 can therefore run over the array plate 1014 to put the passage 1168 in selective communication with tubes 1010.

The drive shaft 1134 is fixedly connected to the hub 1130 at the first end 1136. The catcher is placed over the shaft 1134 and is connected thereto by a clutch arrangement 1174, which will not be described in detail, but is configured to remotely engage and disengage the shaft 1134 with the hub 1144 of the catcher 1142.

At the second end 1138 of the drive shaft 1134, the hub 1158 of the suction assembly 1154 is fixedly attached, such that the selector 1024, drive shaft 1134 and suction assembly 1154 all rotate together. The arm 1156 is oriented such that the vacuum nozzle 1160 is in-line with the passage 1168 of the sample transfer tube 1166.

A second motor 1176 is arranged proximate the first motor 1172, mounted to the top plate 1106 outside the periphery of the plate 1110 of the lid 1020, such that the motor 1176 is static relative to the rotating lid 1020.

A belt arm 1178 extends from the second motor 1176 to above the centre shaft 1188, extending above the catcher 1142. An output shaft 1180 of the motor 1176 has a pulley 1182 defined thereon. The centre shaft 1188 also has a pulley 1183 defined thereon. A belt tensioner 1184 is provided on the belt arm 1178. A drive belt 1186 is provided to transfer torque from the pulley 1182 to the pulley 1183, and is tensioned by the tensioner 1184. As such, the motor can drive the centre shaft 1188 in rotation.

A first gear 1190 is also mounted to the centre shaft 1188, and via an intermediate gear 1192 with a high friction periphery is arranged to drive the rim 1142 of the catcher 1142. The second motor 1176 can thereby drive the catcher 1142, the selector 1024 and the arm 1156 via shaft 1134 and the clutch arrangement 1174 (when engaged) in rotation about the offset axis 1124. The fact that the drive from the second motor 1176 passes through a drive element in the form of pulley 1183 concentric with the tank lid 1020, means that the motor can be mounted on the tank 1002 rather than on the moving lid 1020. This reduces the power requirement of the first motor 1172, and makes the system less complex.

In operation, the lid 1020 is rotated by the first motor 1172. The catcher 1142 and selector 1024 are then rotated by the second motor 1176 to position the passage 1168 over a target sample tube 1010 in the array. The axial compliance and resilience of the tube 1166, and the rotational degree of freedom of the seal 2016 mean that a good seal is always formed with the array plate orifices.

If required, the clutch arrangement 1174 is then disengaged and the catcher 1142 rotated to place an empty chamber 1150 between the vacuum nozzle 1160 and the passage 1168. The vacuum pump 1164 can then be used to suck a sample into the chamber 1150. The catcher 1142 is then indexed and the pump 1164 deactivated, such that another (empty) chamber 1150 can be aligned with the passage 1168. A further sample can then be captured.

The samples in the catcher 1142 can be deposited back into the tank by indexing the catcher 1142 with the pump 1164 deactivated so they fall under gravity.

It will be understood that the various subsystems not specifically described with respect to the apparatus 1000 work in substantially the same manner as the apparatus 100.

Figure 17:
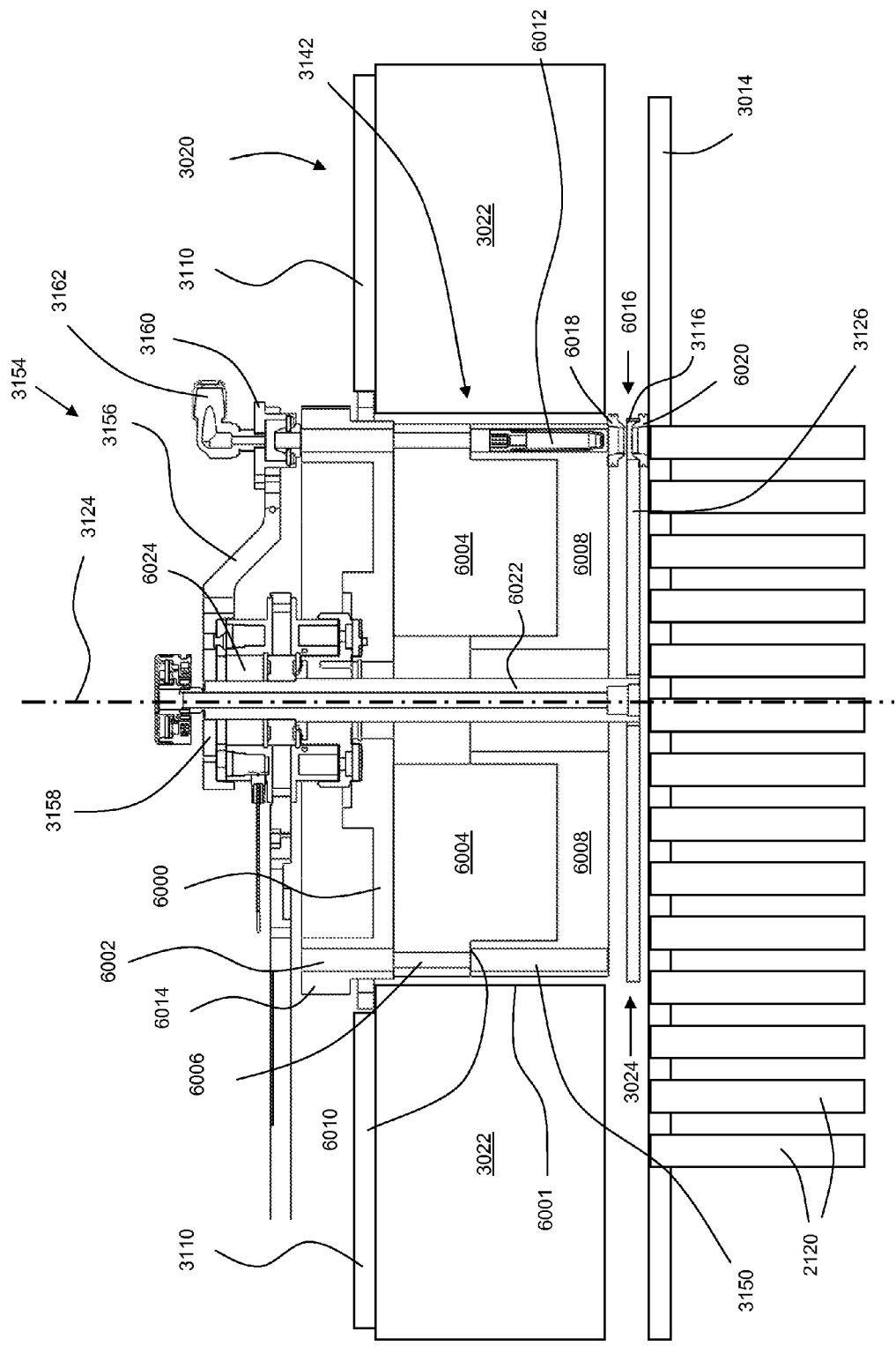
FIG. 17 is a section view of a third storage apparatus in accordance with the present invention.

Turning to FIG. 17, a selector and catcher assembly of a further storage apparatus in accordance with the present invention is shown in section. The apparatus is similar to that of FIGS. 8 to 16c. The main difference is that the selector, and the part of the catcher which temporarily holds the samples is placed within the cold zone of the tank.

A tank lid 3020 comprises a layer of insulating material 3022 with a circular plate 3110 positioned thereon. The lid 3020 covers an array plate 3014 supporting a number of sample tubes 2120. As per the apparatus 1000, the array plate 3014 has a bore leading to a picking apparatus (not shown).

Unlike apparatus 1000, instead of the selector being integrated within the thickness of the lid, and the catcher positioned above, a catcher 3142 is integrated within the thickness of the lid 3020, and is arranged to rotate about an offset axis 3124. The catcher 3142 is generally circular about the offset axis 3124.

The catcher 3142 comprises a circular drive gear 6000 having a plurality of fluid channels 6002 at its periphery.

Adjacent and below the drive gear 6000, there is provided an insulation layer 6004 having a plurality of fluid channels 6006 corresponding to each of the channels 6002 in the drive gear 6000. The insulation layer is arranged to fit within a circular orifice 6001 of the insulation 3022 such that a continuous insulation layer is formed across the top of the tank.

Adjacent the insulation layer 6004 on the opposite side to the drive gear 6000, i.e. on the tank side of the insulation layer 6004, a catcher body 6008 is provided having a plurality of axially oriented chambers 3150 at its periphery. Each chamber 3150 is in fluid communication with one of the fluid channels 6006 and the channels 6002. The channels 6006 in the insulation 6004 are of a smaller diameter relative to the chambers 3150 in the catcher body 6008 so as to form a shoulder 6010. Each chamber 3150 is dimensioned to hold a sample container 6012, and the shoulder 6010 prevents sample containers from entering the channels 6006 when a negative pressure is applied to the channel 6002.

The drive gear 6000, insulation 6004 and catcher body 6008 are attached together and rotatable about the offset axis 3124. The drive gear 6000 comprises an exposed gear formation 6014 for driving by an appropriate motor (not shown).

It will be noted that the thickness of the insulation layer 6004 extends within the thickness of the insulation 3022 of the lid 3020. Therefore the catcher body 3008, including the chambers 3150 in which the sample containers 6012 are temporarily stored are kept at the same temperature as the refrigerated container below. Effectively, the catcher has been moved into the cold zone to maintain the samples at a low temperature.

The selector 3024 comprises a flat plate 3126 having a bore 3116 containing a sprung seal 6016. The sprung seal 6016 comprises two opposing seal members 6018, 6020 which are resiliently biased away from each other are each similar to the seal member 2016. The upper seal member 6018 is resiliently biased towards the bottom of the catcher body 6008 in use, and the lower seal member 6020 is resiliently biased against the array plate 3014 in use.

A suction assembly 3154 is provided similar to that of the apparatus 1000, comprising a radial arm 3156 having a hub 3158 at a first end and extending to a vacuum nozzle 3160 at a second end. The vacuum nozzle 3160 is in fluid communication with a hose adaptor 3162 configured for attachment to a hose (not shown) connected to a vacuum pump (not shown).

The suction assembly 3154 and the selector 3024 are connected by a shaft 6022, which is rotatable about the offset axis 3124 and passes through the main axis of the catcher 3142. The nozzle 3160 and the bore 3116 are always aligned.

A clutch 6024 is provided between the driven catcher 3142 and the shaft 6022, such that as per the apparatus 1000:

(i) the catcher 3142 can be driven in isolation (thus incrementally presenting a new chamber 3150 to the selector 3024) with the clutch 6024 disengaged, or;

(ii) the catcher 3142 can be driven with the selector 3024 and suction assembly 3154 to move over a new part of the array plate 3014 with the clutch 6024 engaged.

In operation, if a sample from one of the tubes 2120 is to be extracted, the lid 3020 is rotated about the main axis (not shown) and the drive gear 6000 of the catcher 3142 is driven in rotation about the offset axis 3124 with the clutch 6024 engaged until the bore 3116 is over the target tube. A negative pressure is applied at the adaptor 3162 to suck a sample into the chamber 3150. The clutch 6024 is then disengaged and the catcher 3142 rotated (without moving the selector 3024) to expose an empty chamber 3150. A further sample is then sucked into the chamber and the process repeated until the target sample can be retrieved.

The temporarily stored samples can then be returned to the tank. It will be noted that at all times the temporarily stored samples have been inside the cold zone.

Variations fall within the scope of the present invention.

The picking apparatus may be held at a temperature between ambient and the tank 102 (for example minus 20 degrees Celsius) to minimise degradation of the samples temporarily held therein.

The second motor 1176 may be mounted on top of the tank lid 1020. Although increasing the inertia of the lid, this may increase the accuracy of positioning of the catcher and selector.

The storage container may contain high temperature environment. In this case, it is desirable to minimise the time at which the samples are kept at a lower temperature.

The invention claimed is:

1. A storage apparatus comprising:
    an array of item storage formations,
    a first member rotatable with respect to the array about a first axis,
    a selector mounted on the first member, the selector being rotatable with respect to the first member about a second axis which is parallel to and offset from the first axis, the second axis being defined as fixed in relation to the first member and being rotatable about the first axis by rotation of the first member about the axis, the selector comprising an item transfer conduit offset from the second axis, and
    a source of differential pressure in fluid communication with the item transfer conduit to selectively propel items into an item receiving formation from the array by the creation of a fluid pressure differential,
    in which the first member and the selector are configured for rotation about the first and second axes respectively to selectively align the item transfer conduit with one of the array of item storage formations to extract the item from the array.

2. A storage apparatus according to claim 1, comprising:
    a temporary storage unit mounted proximate the selector, the temporary storage unit defining a plurality of chambers for temporary storage of items.

3. A storage apparatus according to claim 2, in which the temporary storage unit is in communication with the transfer conduit and is positioned on the opposite side of the selector to the item storage formations.

4. A storage apparatus according to claim 3, in which the temporary storage unit is movably mounted relative to the selector to place the transfer conduit in communication with an individual one of the plurality of chambers.

5. A storage apparatus according to claim 4, in which the temporary storage unit is mounted for concentric rotation with the selector, and in which each of the plurality of chambers is disposed at the same distance from the second axis as the transfer conduit.

6. A storage apparatus according to claim 5, in which the chambers in the temporary storage unit are closed at one end by the selector when not in communication with the transfer conduit.

7. A storage apparatus according to claim 1, in which the source of differential pressure is provided on the other side of the temporary storage unit to the selector such that the source of differential pressure selectively sucks items through the transfer conduit into the chamber in fluid communication with the transfer conduit.

8. A storage apparatus according to claim 7, in which the selector comprises a seal at an orifice of the transfer conduit, which seal bears against the array of item storage formations.

9. A storage apparatus according to claim 8, in which the seal comprises an annular member rotatably mounted within the inlet.

10. A storage apparatus according to claim 9, in which the inlet seal comprises a part spherical surface engaging the inlet.

11. A storage apparatus according to claim 2, comprising an insulation layer, and the temporary storage unit is positioned on the array side of the insulation layer.

12. A storage apparatus according to claim 11, in which the first member comprises a first region of the insulation layer, and the temporary storage unit comprises a second region of the insulation layer, which first and second parts are adjacent to form a substantially contiguous insulation layer.

13. A storage apparatus according to claim 2, comprising an insulation layer, and the temporary storage unit is positioned on the side of the insulation layer opposite to the array.

14. A storage apparatus according to claim 13, in which the first member comprises a first region of the insulation layer, and the selector comprises a second region of the insulation layer, which first and second parts are adjacent to form a substantially contiguous insulation layer.

15. A storage apparatus according to claim 1, in which the array comprises a plurality of elongate conduits parallel to the first and second axes, the selector being configured to selectively place each of the elongate conduits in communication with the item receiving formation.

16. A storage apparatus according to claim 15, in which the plurality of elongate conduits are provided within pipes.

* * * * *